United States Patent
Onoue et al.

(10) Patent No.: US 9,928,961 B2
(45) Date of Patent: Mar. 27, 2018

(54) MULTILAYER CAPACITOR

(71) Applicant: TDK CORPORATION, Tokyo (JP)

(72) Inventors: Toru Onoue, Tokyo (JP); Kenta Yamashita, Tokyo (JP); Yuma Hattori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/040,358

(22) Filed: Feb. 10, 2016

(65) Prior Publication Data
US 2016/0284475 A1    Sep. 29, 2016

(30) Foreign Application Priority Data
Mar. 25, 2015  (JP) ................ 2015-062562

(51) Int. Cl.
*H01G 4/228* (2006.01)
*H01G 4/30* (2006.01)
*H01G 4/232* (2006.01)
*H01G 4/12* (2006.01)

(52) U.S. Cl.
CPC .............. *H01G 4/30* (2013.01); *H01G 4/232* (2013.01); *H01G 4/12* (2013.01)

(58) Field of Classification Search
CPC .......... H01G 4/232; H01G 4/228; H01G 4/30
See application file for complete search history.

(56) References Cited

U.S. PATENT DOCUMENTS

| 2015/0075853 A1* | 3/2015 | Lee ................ H01G 2/06 174/260 |
| 2015/0098202 A1* | 4/2015 | Lee ................ H01G 4/30 361/761 |
| 2016/0093438 A1* | 3/2016 | Sasabayashi ........... H01G 4/12 174/260 |
| 2016/0093440 A1* | 3/2016 | Nishisaka ............ H01G 4/2325 361/301.4 |
| 2016/0095223 A1* | 3/2016 | Yoshida ............... H01G 4/2325 174/260 |

FOREIGN PATENT DOCUMENTS

| JP | 2005-243835 A | 9/2005 |
| JP | 2011176238 A * | 9/2011 |
| JP | 2014239139 A * | 12/2014 |

* cited by examiner

*Primary Examiner* — Eric Thomas
(74) *Attorney, Agent, or Firm* — Oliff PLC

(57) ABSTRACT

An element body includes a pair of principal surfaces, a pair of side surfaces, and another pair of side surfaces. Each of a pair of terminal electrodes includes a first electrode portion disposed on the principal surface and a second electrode portion disposed on the side surface. In the element body, a length in a direction in which the pair of principal surfaces oppose each other is smaller than a length in a direction in which the pair of side surfaces oppose each other and smaller than a length in a direction in which the other pair of side surfaces oppose each other. An arithmetic mean deviation of the surface of the first electrode portion is from 0.20 to 0.26 μm. An arithmetic mean deviation of the surface of the second electrode portion is from 0.27 to 0.38 μm.

2 Claims, 10 Drawing Sheets

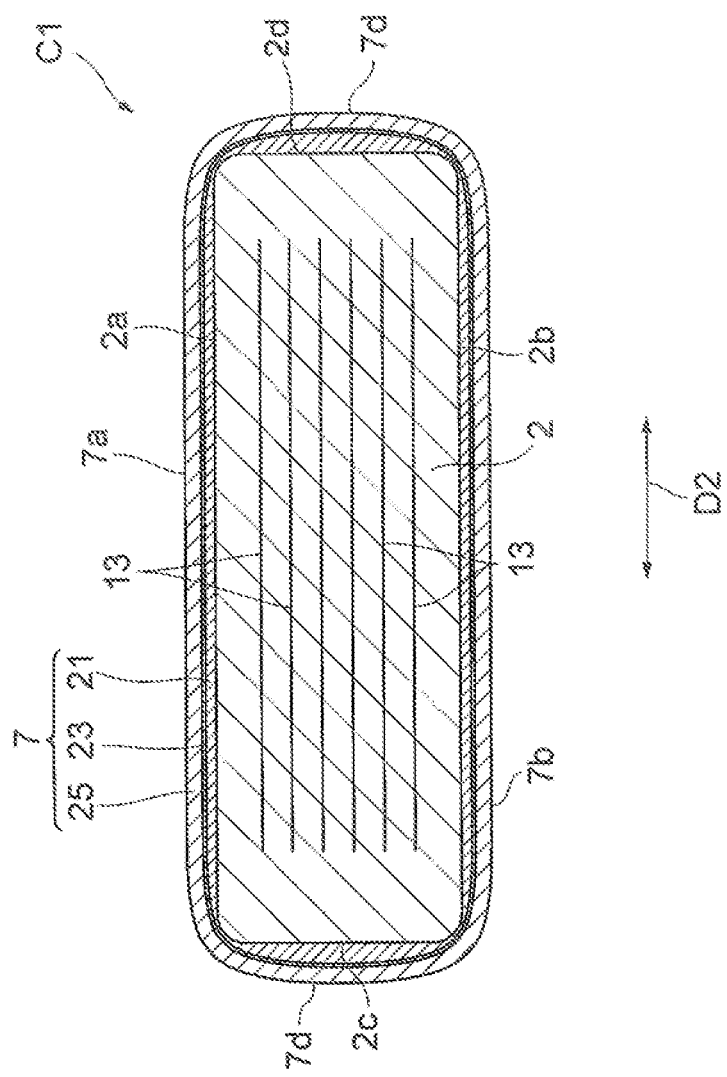

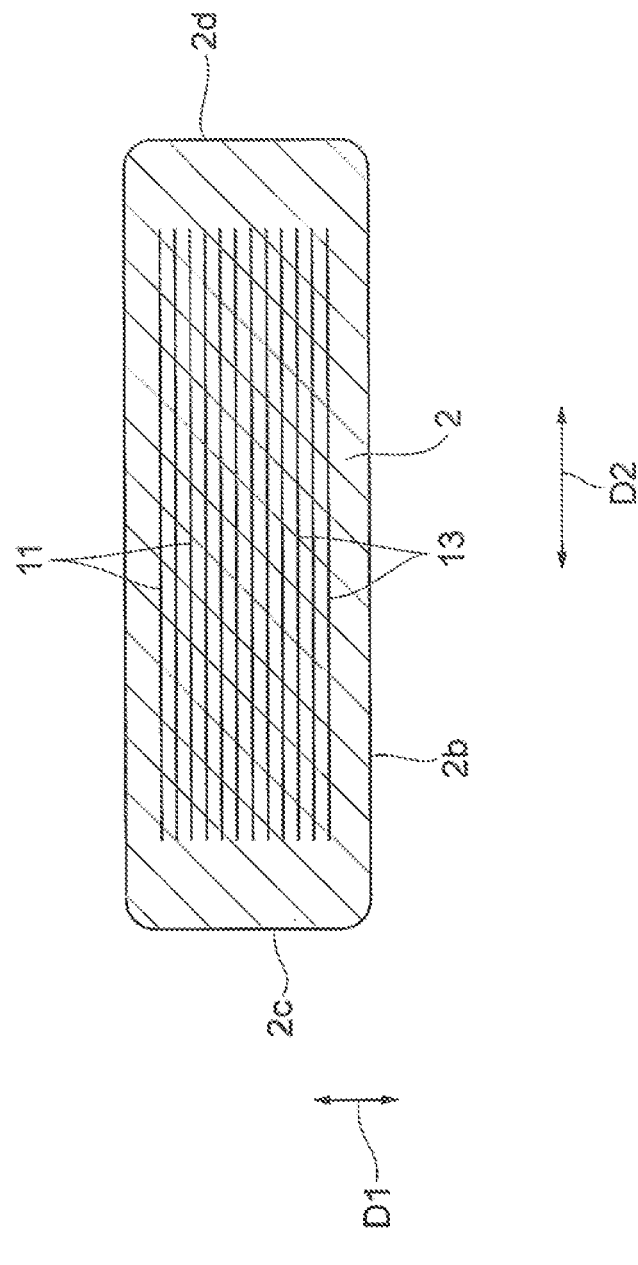

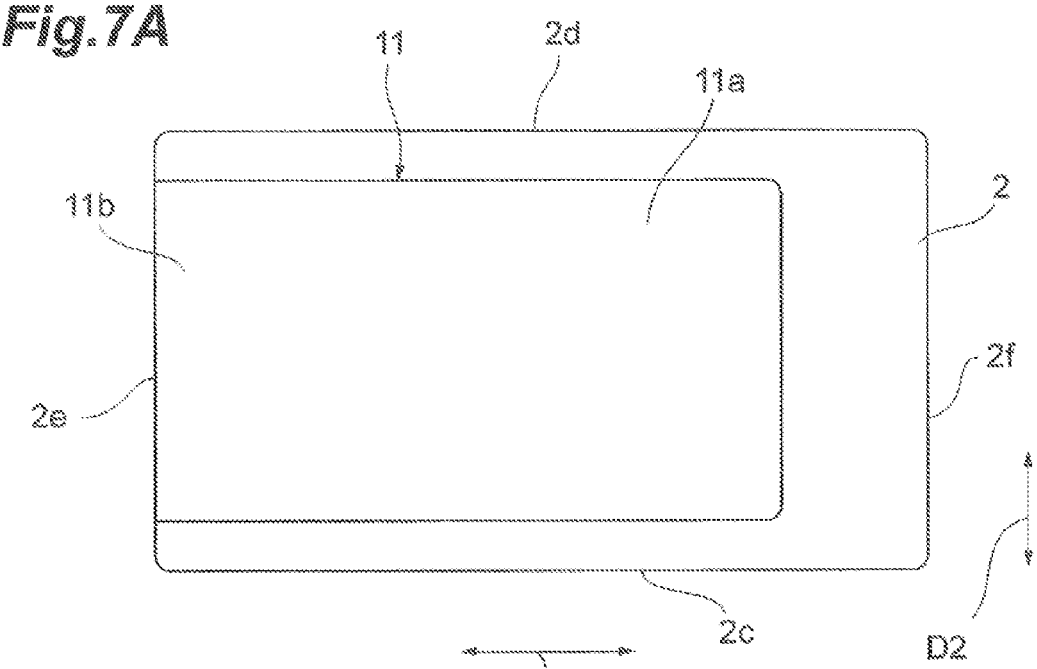
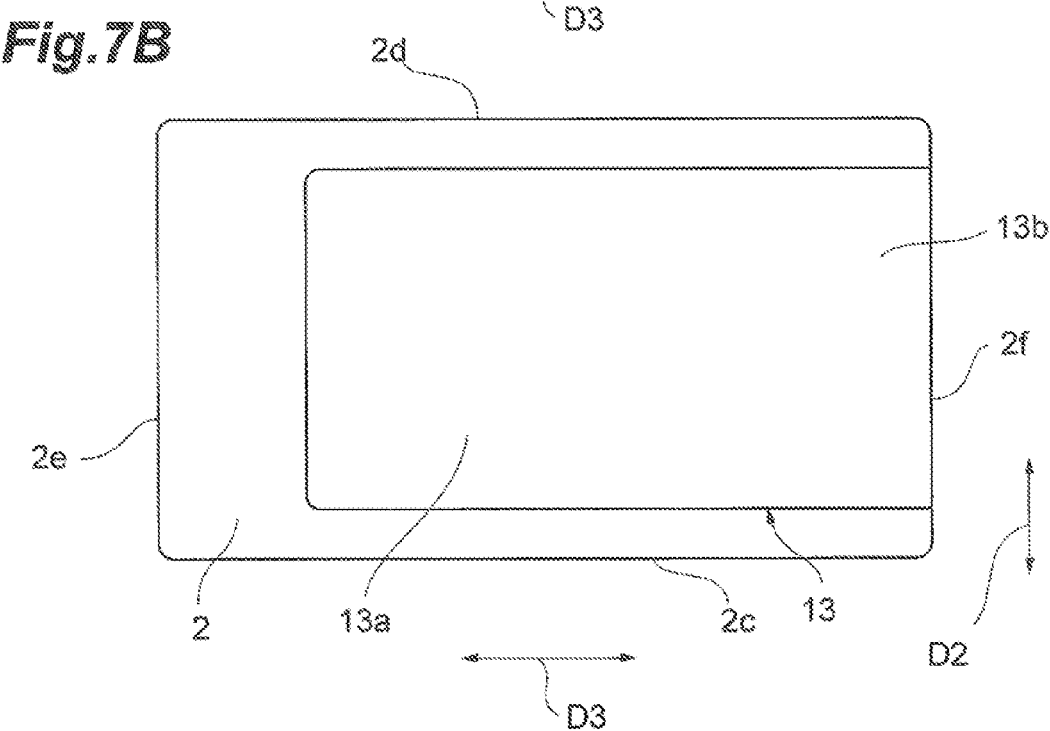

Fig. 9

| | Arithmetic mean deviation of surfaces of electrode portions 5a, 5b, 7a, 7b (μm) | Arithmetic mean deviation of surfaces of electrode portions 5c, 5d, 7c, 7d (μm) | Number of void occurrences between electrode portions 5a, 5b, 7a, 7b and via conductors | Number of void occurrences between electrode portions 5c, 5d, 7c, 7d and resin | Number of peeling occurrences between electrode portions 5a, 5b, 7a, 7b and via conductors | Number of peeling occurrences between electrode portions 5c, 5d, 7c, 7d and resin |
|---|---|---|---|---|---|---|
| Sample1 | 0.15 | 0.19 | 0/10 | 0/10 | 3/10 | 4/10 |
| Sample2 | 0.15 | 0.25 | 0/10 | 0/10 | 3/10 | 2/10 |
| Sample3 | 0.15 | 0.38 | 0/10 | 0/10 | 3/10 | 0/10 |
| Sample4 | 0.20 | 0.18 | 0/10 | 0/10 | 0/10 | 4/10 |
| Sample5 | 0.20 | 0.27 | 0/10 | 0/10 | 0/10 | 0/10 |
| Sample6 | 0.20 | 0.34 | 0/10 | 0/10 | 0/10 | 0/10 |
| Sample7 | 0.20 | 0.38 | 0/10 | 0/10 | 0/10 | 0/10 |
| Sample8 | 0.20 | 0.40 | 0/10 | 2/10 | — | — |
| Sample9 | 0.23 | 0.25 | 0/10 | 0/10 | 0/10 | 2/10 |
| Sample10 | 0.23 | 0.28 | 0/10 | 0/10 | 0/10 | 0/10 |
| Sample11 | 0.23 | 0.32 | 0/10 | 0/10 | 0/10 | 0/10 |
| Sample12 | 0.23 | 0.37 | 0/10 | 0/10 | 0/10 | 0/10 |
| Sample13 | 0.23 | 0.40 | 0/10 | 2/10 | — | — |
| Sample14 | 0.26 | 0.25 | 0/10 | 0/10 | 0/10 | 2/10 |
| Sample15 | 0.26 | 0.27 | 0/10 | 0/10 | 3/10 | 0/10 |
| Sample16 | 0.26 | 0.32 | 0/10 | 0/10 | 0/10 | 0/10 |
| Sample17 | 0.26 | 0.38 | 0/10 | 0/10 | 0/10 | 0/10 |
| Sample18 | 0.26 | 0.40 | 0/10 | 2/10 | — | — |
| Sample19 | 0.30 | 0.27 | 3/10 | 0/10 | — | — |

Fig. 10

| | Arithmetic mean deviation of surfaces of electrode portions 5a, 5b, 7a, 7b (μm) | Arithmetic mean deviation of surfaces of electrode portions 5c, 5d, 7c, 7d (μm) | Arithmetic mean deviation of surface of element body (μm) | Number of void occurrences between element body and resin | Number of peeling occurrences between element body and resin |
|---|---|---|---|---|---|
| Sample20 | 0.20 | 0.27 | 0.12 | 0/10 | 2/10 |
| Sample21 | 0.20 | 0.27 | 0.14 | 0/10 | 0/10 |
| Sample22 | 0.20 | 0.27 | 0.16 | 0/10 | 0/10 |
| Sample23 | 0.20 | 0.27 | 0.19 | 0/10 | 0/10 |
| Sample24 | 0.20 | 0.27 | 0.27 | 4/10 | — |
| Sample25 | 0.26 | 0.27 | 0.14 | 0/10 | 0/10 |
| Sample26 | 0.26 | 0.27 | 0.17 | 0/10 | 0/10 |
| Sample27 | 0.26 | 0.27 | 0.19 | 0/10 | 0/10 |
| Sample28 | 0.26 | 0.27 | 0.21 | 3/10 | — |
| Sample29 | 0.20 | 0.38 | 0.11 | 0/10 | 2/10 |
| Sample30 | 0.20 | 0.38 | 0.14 | 0/10 | 0/10 |
| Sample31 | 0.20 | 0.38 | 0.15 | 0/10 | 0/10 |
| Sample32 | 0.20 | 0.38 | 0.18 | 0/10 | 0/10 |
| Sample33 | 0.20 | 0.38 | 0.25 | 4/10 | — |
| Sample34 | 0.26 | 0.38 | 0.14 | 0/10 | 0/10 |
| Sample35 | 0.26 | 0.38 | 0.17 | 0/10 | 0/10 |
| Sample36 | 0.26 | 0.38 | 0.19 | 0/10 | 0/10 |
| Sample37 | 0.26 | 0.38 | 0.22 | 3/10 | — |

MULTILAYER CAPACITOR

TECHNICAL FIELD

The present invention relates to a multilayer capacitor.

BACKGROUND

Known multilayer capacitors include an element body of a rectangular parallelepiped shape, a plurality of internal electrodes, and a pair of terminal electrodes (e.g., cf. Japanese Unexamined Patent Publication No. 2005-243835). The element body includes a pair of principal surfaces opposing each other, a pair of side surfaces opposing each other, and another pair of side surfaces opposing each other. The plurality of internal electrodes are disposed in the element body to oppose each other in a direction in which the pair of principal surfaces opposing each other. The pair of terminal electrodes are disposed at the respective two ends of the element body in a direction in which the other pair of side surfaces oppose each other. The pair of terminal electrodes are connected each to corresponding internal electrodes out of the plurality of internal electrodes.

SUMMARY

Electronic equipment such as information terminal devices has been becoming smaller and thinner. In conjunction therewith, substrates mounted on the electronic equipment and electronic components mounted on the substrates have been downsized and mounted in higher density. Substrates with built-in electronic components have been developed for further reduction in size of electronic equipment in such substrates with built-in electronic components, the electronic components are mounted on the substrate to be embedded therein. The embedded electronic component needs to be securely electrically connected to wiring formed on the substrate. In the case of the multilayer capacitor described in Japanese Unexamined Patent Publication No. 2005-243835, however, no consideration is given to embedment in the substrate (built-in mounting in the substrate) and electrical connection to the wiring formed on the substrate.

One aspect of the present invention provides a multilayer capacitor that can be suitably built into a substrate, achieves reduction in height, and ensures connectivity to wiring formed on the substrate.

A multilayer capacitor according to one aspect of the present invention includes an element body of a rectangular parallelepiped shape, a plurality of internal electrodes, and a pair of terminal electrodes. The element body includes a pair of principal surfaces opposing each other, a pair of side surfaces opposing each other, and another pair of side surfaces opposing each other. The plurality of internal electrodes are disposed in the element body to oppose each other in a direction in which the pair of principal surfaces oppose each other. The pair of terminal electrodes are connected each to corresponding internal electrodes out of the plurality of internal electrodes. Each terminal electrode includes a first electrode portion disposed on the principal surface and a second electrode portion disposed on the side surface. A length of the element body in the direction in which the pair of principal surfaces oppose each other is smaller than a length of the element body in a direction in which the pair of side surfaces oppose each other and smaller than a length of the element body in a direction in which the other pair of side surfaces oppose each other. An arithmetic mean deviation of the surface of the first electrode portion is from 0.20 to 0.26 µm. An arithmetic mean deviation of the surface of the second electrode portion is from 0.27 to 0.38 µm.

In the multilayer capacitor according to the one aspect, the length of the element body in the direction in which the pair of principal surfaces oppose each other is smaller than the length of the element body in the direction in which the pair of side surfaces oppose each other and smaller than the length of the element body in the direction in which the other pair of side surfaces oppose each other. For this reason, the multilayer capacitor according to the foregoing aspect is obtained that has reduced height and is suitable for built-in mounting in a substrate. Each terminal electrode includes the first electrode portion disposed on the principal surface. For this reason, the multilayer capacitor according to the one aspect can be electrically connected to wiring formed on the substrate, on the foregoing principal surface side. Therefore, the multilayer capacitor according to the one aspect can be readily built into the substrate.

The multilayer capacitor is placed in a housing portion of the substrate and thereafter the housing portion is filled with a resin, whereby the multilayer capacitor is built into the substrate. After the multilayer capacitor is built into the substrate, via holes are formed in the substrate to reach the respective terminal electrodes (first electrode portions). Thereafter, conductors are formed in the respective via holes. The conductors formed in the via holes are connected to the first electrode portions.

In the multilayer capacitor according to the one aspect, the arithmetic mean deviation of the surface of the first electrode portion is from 0.20 to 0.26 µm and the arithmetic mean deviation of the surface of the second electrode portion is from 0.27 to 0.38 µm. For this reason, a void is prevented from occurring between the conductor formed in each via hole and the first electrode portion. A void is also prevented from occurring between the resin filled in the housing portion and the second electrode portion. Peeling is also prevented from occurring between the conductor and the first electrode portion. Peeling between the resin and the second electrode portion is also prevented. As a result of these, the multilayer capacitor according to the above aspect can be suitably built into the substrate, and ensures connectivity to the wiring formed on the substrate.

An arithmetic mean deviation of the surface of the element body exposed from the pair of terminal electrodes may be from 0.14 to 0.19 µm. In this case, a void is prevented from occurring between the resin filled in the housing portion and the element body. Peeling between the resin and the element body is also prevented. As a result of these, the multilayer capacitor of this embodiment can be more suitably built into the substrate.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a drawing for explaining a cross-sectional configuration along the line V-V in FIG. 2.

FIG. 6 is a drawing for explaining a cross-sectional configuration along the line VI-VI in FIG. 2.

FIG. 7A is a plan view showing a first internal electrode and FIG. 7B a plan view showing a second internal electrode.

FIG. 9 is a table showing the number of void occurrences and the number of peeling occurrences in each of Samples.

FIG. 10 is a table showing the number of void occurrences and the number of peeling occurrences in each of Samples.

DETAILED DESCRIPTION

Embodiments of the present invention will be described below in detail with reference to the accompanying drawings. In the description, the same elements or elements with the same functionality will be denoted by the same reference signs, without redundant description.

Figure 1:
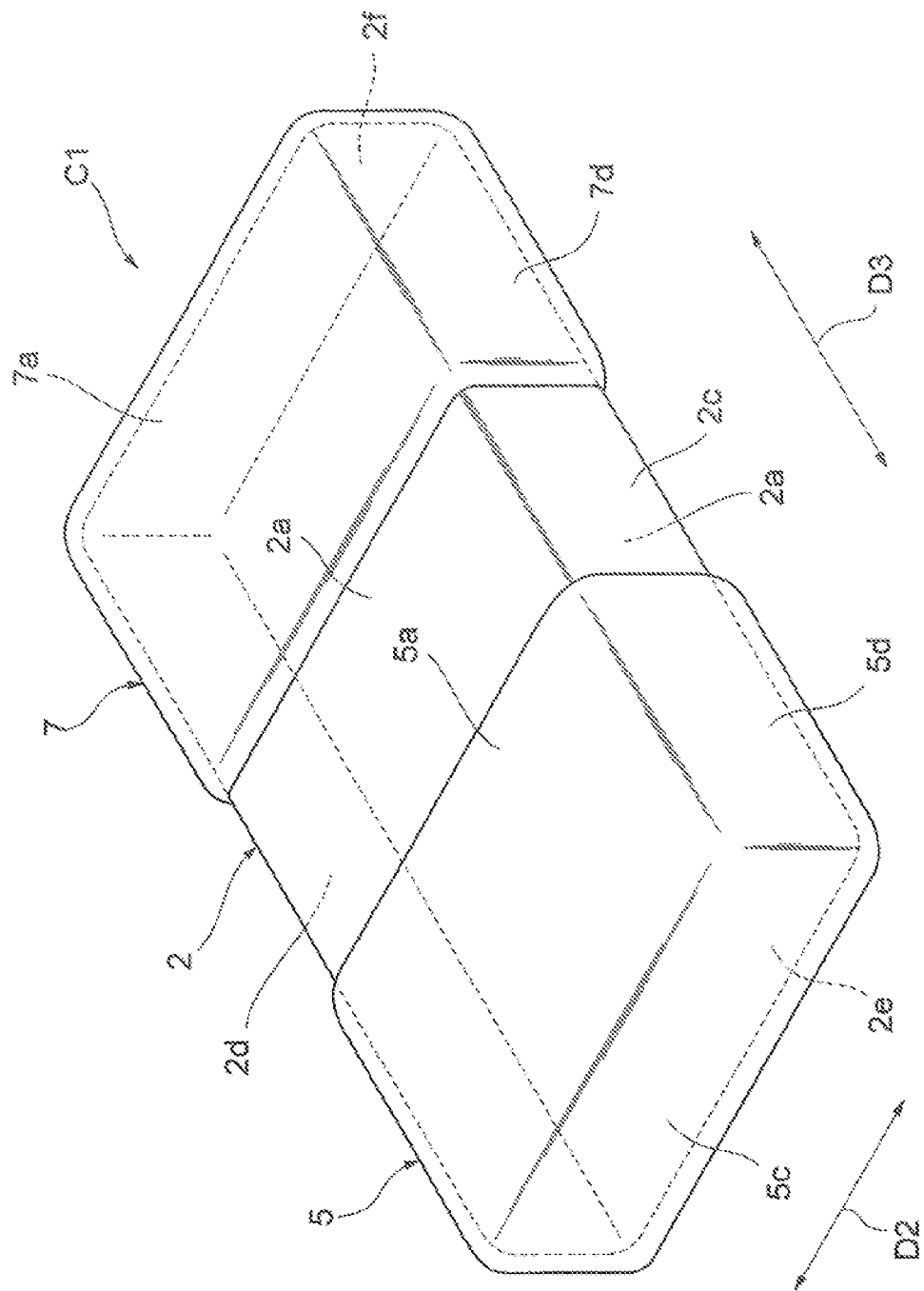
FIG. 1 is a perspective view showing a multilayer capacitor according to an embodiment.
Figure 2:
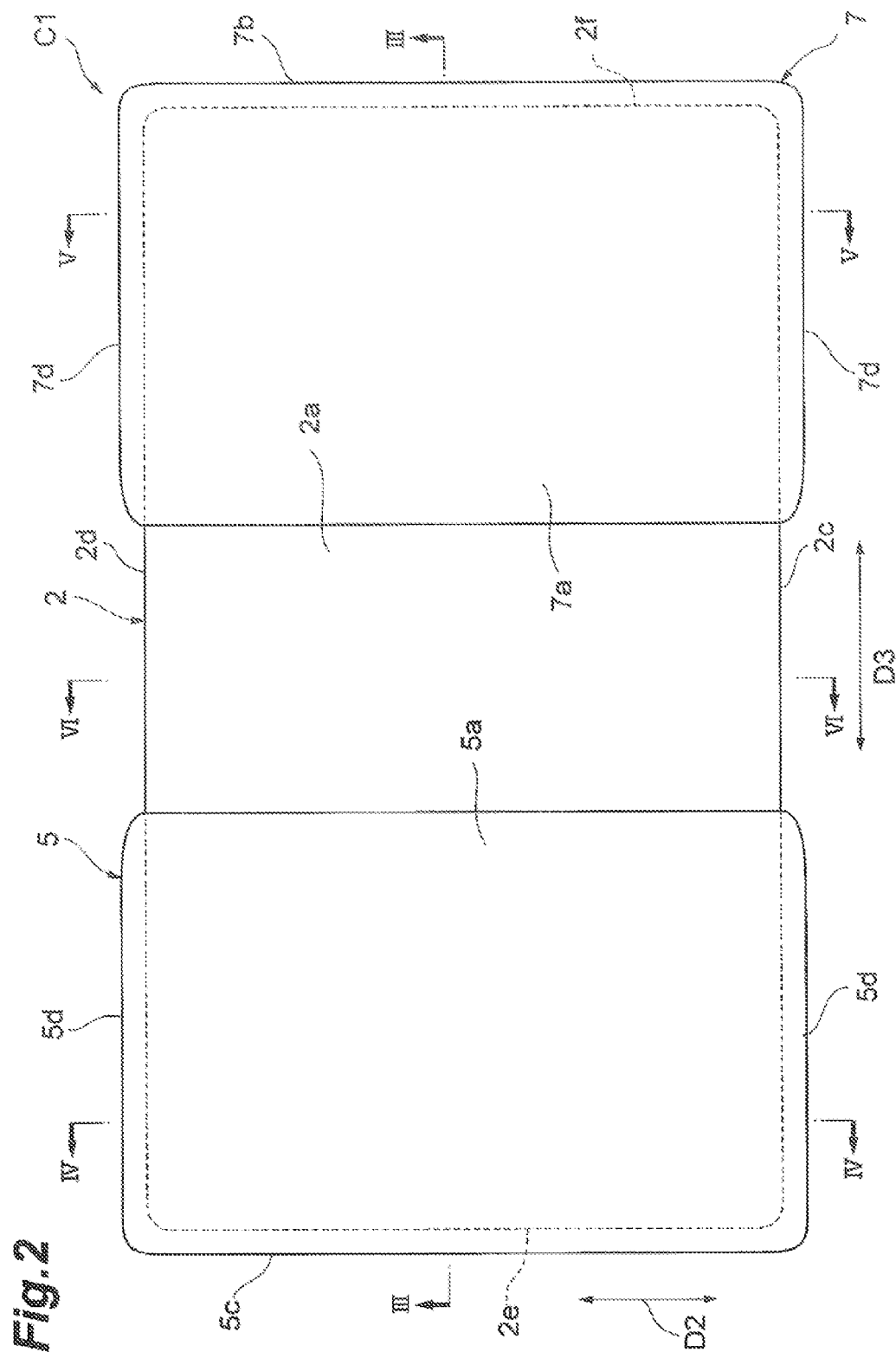
FIG. 2 is a plan view showing the multilayer capacitor according to the embodiment.
Figure 3:
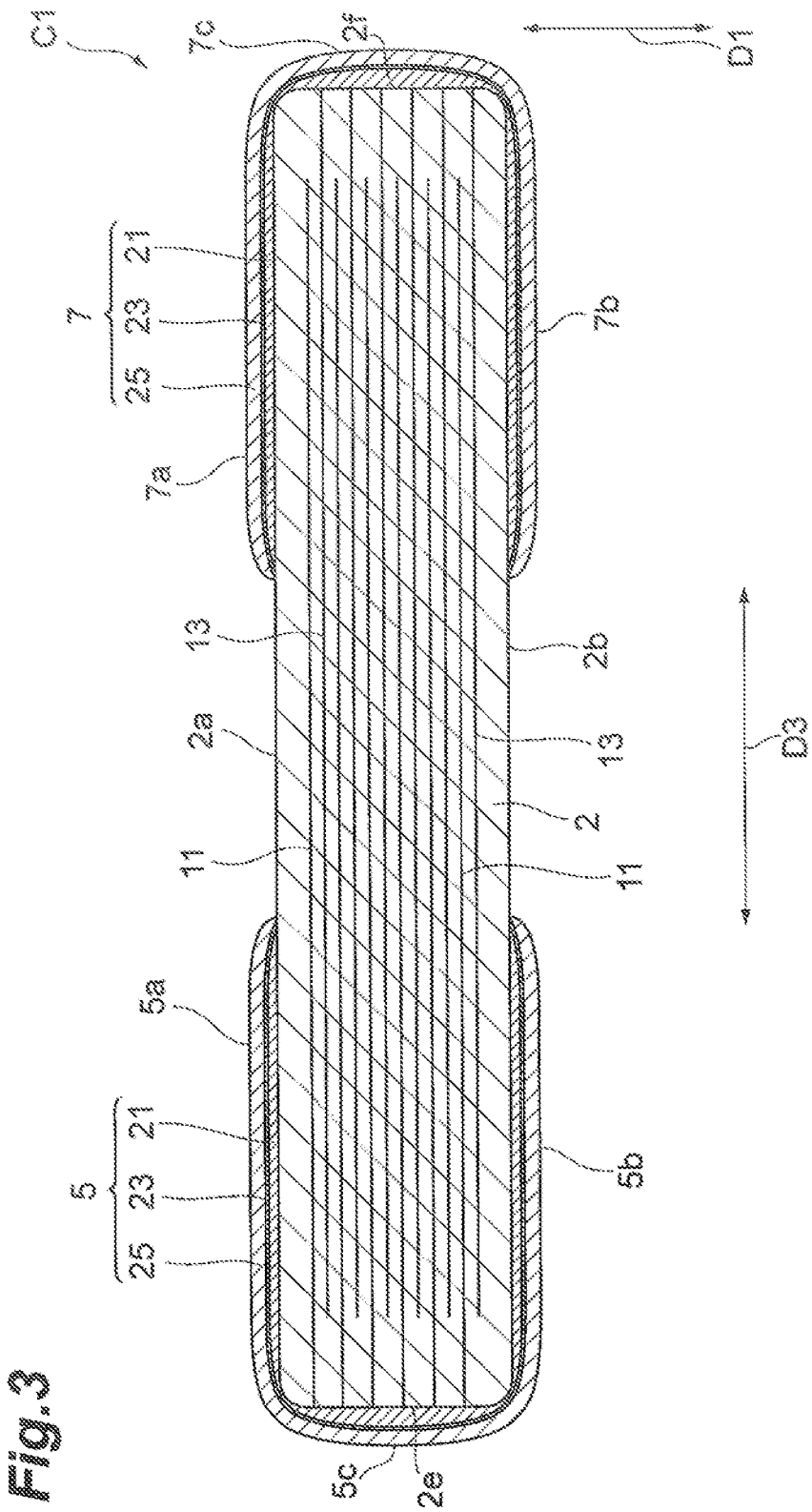
FIG. 3 is a drawing for explaining a cross-sectional configuration along the line III-III in FIG. 2.
Figure 4:
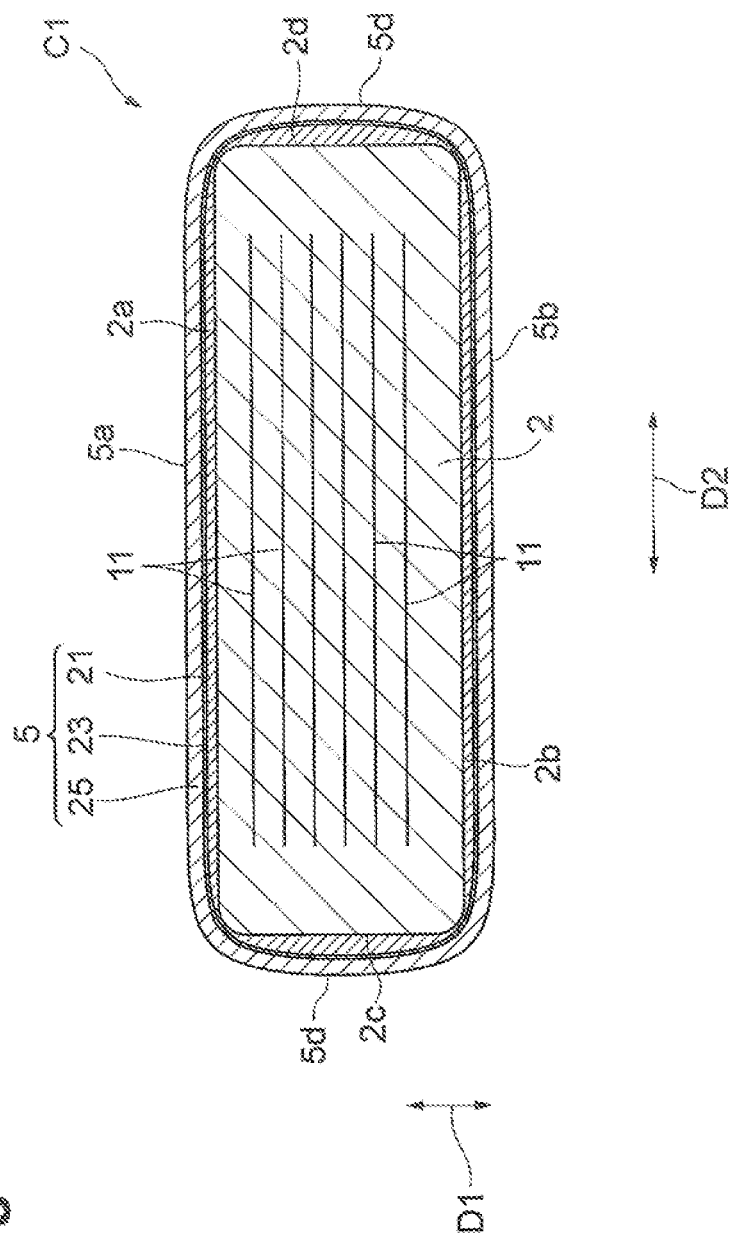
FIG. 4 is a drawing for explaining a cross-sectional configuration along the line IV-IV in FIG. 2.

A configuration of a multilayer capacitor C1 according to the present embodiment will be described with reference to FIGS. 1 to 6. FIG. 1 is a perspective view showing the multilayer capacitor according to the present embodiment. FIG. 2 is a plan view showing the multilayer capacitor according to the present embodiment. FIG. 3 in a drawing for explaining a cross-sectional configuration along the line III-III in FIG. 2. FIG. 4 is a drawing for explaining a cross-sectional configuration along the line IV-IV in FIG. 2. FIG. 5 is a drawing for explaining a cross-sectional configuration along the line V-V in FIG. 2. FIG. 6 is a drawing for explaining a cross-sectional configuration along the line VI-VI in FIG. 2.

The multilayer capacitor C1, as shown in FIGS. 1 to 6, includes an element body 2 of a rectangular parallelepiped shape, and, a first terminal electrode 5 and a second terminal electrode 7 disposed on the exterior surface of the element body 2. The first terminal electrode 5 and second terminal electrode 7 are separated from each other. The rectangular parallelepiped shape embraces a shape of a rectangular parallelepiped with chamfered corners and ridgelines, and a shape of a rectangular parallelepiped with rounded corners and ridgelines.

The element body 2 includes, as the outer surface, a pair of principal surfaces 2a, 2b of a substantially rectangular shape opposing each other, a pair of first side surfaces 2c, 2d opposing each other, and a pair of second side surfaces 2e, 2f opposing each other. A direction in which the pair of principal surfaces 2a, 2b oppose is a first direction D1, a direction in which the pair of first side surfaces 2c, 2d oppose is a second direction D2, and a direction in which the pair of second side surfaces 2e, 2f oppose is a third direction D3. In the present embodiment, the first direction D1 is a height direction of the element body 2. The second direction D2 is a width direction of the element body 2 and is perpendicular to the first direction D1. The third direction D3 is the longitudinal direction of the element body 2 and is perpendicular to the first direction D1 and to the second direction D2.

The length in the first direction D1 of the element body 2 is smaller than the length in the third direction D3 of the element body 2 and smaller than the length in the second direction D2 of the element body 2. The length in the third direction D3 of the element body 2 is larger than the length in the second direction D2 of the element body 2. The length in the third direction D3 of the element body 2 is, for example, from 0.4 to 1.6 mm. The length in the second direction D2 of the element body 2 is, for example, from 0.2 to 0.8 mm. The length in the first direction D1 of the element body 2 is, for example, from 0.1 to 0.35 mm. The multilayer capacitor C1 is an ultra-low-profile multilayer capacitor. The length in the second direction D2 of the element body 2 may be equivalent to the length in the third direction D3 of the element body 2. The length in the second direction D2 of the element body 2 may be larger than the length in the third direction D3 of the element body 2.

It is noted herein that the term "equivalent" does not always mean that values are exactly equal. The values may also be said to be equivalent in cases where the values have a slight difference within a predetermined range or include a manufacturing error or the like. For example, when a plurality of values fall within the range of ±5% of an average of the plurality of values, the plurality of values may be defined as equivalent.

The pair of first side surfaces 2c, 2d extend in the first direction D1 to connect the pair of principal surfaces 2a, 2b. The pair of first side surfaces 2c, 2d also extend in the third direction D3 (the long-side direction of the pair of principal surfaces 2a, 2b). The pair of second side surfaces 2e, 2f extend in the first direction D1 to connect the pair of principal surfaces 2a, 2b. The pair of second side surfaces 2e, 2f also extend in the second direction D2 (the short-side direction of the pair of principal surfaces 2a, 2b).

The element body 2 is constituted of a plurality of dielectric layers stacked in the direction in which the principal surface 2a and the principal surface 2b oppose (the first direction D1). In the element body 2, the direction in which the plurality of dielectric layers are stacked coincides with the first direction D1. For example, each dielectric layer includes a sintered body of a ceramic green sheet containing a dielectric material ($BaTiO_3$-based, $Ba(Ti, Zr)O_3$-based, $(Ba, Ca)TiO_3$-based, or other dielectric ceramic). In the element body 2 in practice, the dielectric layers are so integrated that no boundary can be visually recognized between the dielectric layers.

The multilayer capacitor C1, as shown in FIGS. 3 to 6, includes a plurality of first internal electrodes 11 and a plurality of second Internal electrodes 13. The first and second internal electrodes 11, 13 contain an electroconductor material (e.g., Ni or Cu or the like) that is commonly used as internal electrodes of multilayer electric elements. Each of the first and second internal electrodes 11, 13 includes a sintered body of an eleetroconductive paste containing the foregoing electroconductive material.

The first internal electrodes 11 and the second internal electrodes 13 are disposed at different positions (layers) in the first direction D1. The first internal electrodes 11 and the second internal electrodes 13 are alternately disposed to oppose with a space in between in the first direction D1, in the element body 2. The first internal electrodes 11 and the second internal electrodes 13 have respective polarities different from each other.

Each first internal electrode 11, as shown in FIG. 7A, includes a main electrode portion 11a and a connection portion 11b. The connection portion 11b extends from one side (one short side) of the main electrode portion 11a and is exposed on the second side surface 2e. The first infernal electrode 11 is exposed on the second side surface 2e but not exposed in the pair of principal surfaces 2a, 2b, the pair of first side surfaces 2c, 2d, and the second side surface 2f. The main electrode portion 11a and the connection portion 11b are integrally formed.

The main electrode portion 11a is of a rectangular shape with the long sides along the third direction D3 and the short sides along the second direction D2. In the main electrode portion 11a of each first internal electrode 11, the length thereof in the third direction D3 is larger than the length thereof in the second direction D2. The connection portion 11b extends from the end on the second side surface 2e side of the main electrode portion 11a to the second side surface 2e. The length in the third direction D3 of the connection portion 11b is smaller than the length in the third direction D3 of the main electrode portion 11a. The length in the second direction D2 of the connection portion 11b is equivalent to the length in the second direction D2 of the main electrode portion 11a. The connection portion 11b is connected at it end exposed on the second side surface 2e, to the first terminal electrode 5. The length in the second direction D2 of the connection portion 11b may be smaller than the length in the second direction D2 of the main electrode portion 11a.

Each second internal electrode 13, as shown in FIG. 7B, includes a main electrode portion 13a and a connection portion 13b. The main electrode portion 13a opposes the main electrode portion 11a through a part (dielectric layer) of the element body 2 in the first direction D1. The connection portion 13b extends from one side (one short side) of the main electrode portion 13a and is exposed on the second side surface 21. The second internal electrode 13 is exposed on the second side surface 2f but not exposed on the pair of principal surfaces 2a, 2b, the pair of first side surfaces 2c, 2d, and the second side surface 2e. The main electrode portion 13a and the connection portion 13b are integrally formed.

The main electrode portion 13a is of a rectangular shape with the long sides along the third direction D3 and the short sides along the second direction D2. In the main electrode portion 13a of each second internal electrode 13, the length thereof in the third direction D3 is larger than the length thereof in the second direction D2. The connection portion 13b extends from the end on the second side surface 2f side of the electrode portion 13a to the second side surface 2f. The length in the third direction D3 of the connection portion 13b is smaller than the length in the third direction D3 of the main electrode portion 13a. The length in the second direction D2 of the connection portion 13b is equivalent to the length in the second direction D2 of the main electrode portion 13a. The connection portion 13b is connected at its end exposed on the second side surface 2f, to the second terminal electrode 7. The length in the second direction D2 of the connection portion 13b may be smaller than the length in the second direction D2 of the main electrode portion 13a.

The first terminal electrode 5 is located at the end on the second side surface 2e side of the element body 2 when viewed along the third direction D3. The first terminal electrode 5 includes an electrode portion 5a disposed on the principal surface 2a, an electrode portion 5b disposed on the principal surface 2b, an electrode portion 5c disposed on the second side surface 2e, and electrode portions 5d disposed on the pair of first side surfaces 2c, 2d. The first terminal electrode 5 is formed on the five surfaces 2a, 2b, 2c, 2d, and 2e. The electrode portions 5a, 5b, 5c, 5d adjacent to each other are connected to each other at the ridgelines of the element body 2 to be electrically connected to each other.

The electrode portion 5a and the electrode portion 5c are connected at the ridgeline between the principal surface 2a and the second side surface 2e. The electrode portion 5a and the electrode portions 5d are connected at the ridgelines between the principal surface 2a and each of the first side surfaces 2c, 2d. The electrode portion 5b and the electrode portion 5c are connected at the ridgeline between the principal surface 2b and the second side surface 2e. The electrode portion 5b and the electrode portions 5d are connected at the ridgelines between the principal surface 2b and each of the first side surfaces 2c, 2d. The electrode portion 5c and the electrode portions 5d are connected at the ridgelines between the second side surface 2e and each of the first side surfaces 2c, 2d.

The electrode portion 5c is disposed to cover all exposed portions of the respective connection portions 11b on the second side surface 2e. Each connection portion 11b is directly connected to the first terminal electrode 5. The connection portion 11b connects the main electrode portion 11a and the electrode portion 5c. Each first internal electrode 11 is electrically connected to the first terminal electrode 5.

The second terminal electrode 7 is located at the end on the second side surface 2f side of the element body 2 when viewed along the third direction D3. The second terminal electrode 7 includes an electrode portion 7a disposed on the principal surface 2a, an electrode portion 7b disposed on the principal surface 2b, in electrode portion 7c disposed on the second side surface 2f, and electrode portions 7d disposed on the pair of first side surfaces 2c, 2d. The second terminal electrode 7 is formed on the five surfaces 2a, 2b, 2c, 2d, and 2f. The electrode portions 7a, 7b, 7c, 7d adjacent to each other are connected to each other at the ridgelines of the element body 2 to be electrically connected to each other.

The electrode portion 7a and the electrode portion 7c are connected at the ridgeline between the principal surface 2a and the second side surface 2f. The electrode portion 7a and the electrode portions 7d are connected at the ridgelines between the principal surface 2a and each of the first side surfaces 2c, 2d. The electrode portion 7b and the electrode portion 7c are connected at the ridgeline between the principal surface 2b and the second side surface 2f. The electrode portion 7b and the electrode portions 7d are connected at the ridgelines between the principal surface 2b and each of the first side surfaces 2c, 2d. The electrode portion 7c and the electrode portions 7d are connected at the ridgelines between the second side surface 2f and each of the first side surfaces 2c, 2d.

The electrode portion 7c is disposed to cover all exposed portions of the respective connection portions 13b on the second side surface 2f. Each connection portion 13b is directly connected to the second terminal electrode 7. The connection portion 13b connects the main electrode portion 13a and the electrode portion 7c. Each second internal electrode 13 is electrically connected to the second terminal electrode 7.

The first terminal electrode 5 and the second terminal electrode 7 are separated in the third direction D3. The element body 2 is exposed between the first terminal electrode 5 and the second terminal electrode 7. The electrode portion 5a and the electrode portion 7a disposed on the principal surface 2a are separated in the third direction D3 on the principal surface 2a. The electrode portion 5b and the electrode portion 7b disposed on the principal surface 2b are separated in the third direction D3 on the principal surface 2b. The electrode portion 5d and the electrode portion 7d disposed on the first side surface 2c are separated in the third direction D3 on the first side surface 2c. The electrode portion 5d and the electrode portion 7d disposed on the first side surface 2d are separated in the third direction D3 on the first side surface 2d.

Each of the first and second terminal electrodes 5, 7 includes a first electrode layer 21, a second electrode layer 23, and a third electrode layer 25. Each of the electrode portions 5a, 5b, 5c, 5d and the electrode portions 7a, 7b, 7c, 7d includes the first electrode layer 21, second electrode layer 23, and third electrode layer 25. The third electrode layer 25 constitutes the outermost layer of each of the first and second terminal electrodes 5, 7.

The first electrode layer 21 is formed by applying an electroconductive paste onto the surface of the element body 2 and sintering it. The first electrode layer 21 is a sintered conductor layer (sintered metal layer). In the present embodiment, the first electrode layer 21 is a sintered conductor layer made of Cu. The first electrode layer 21 may be a sintered conductor layer made of Ni. The first electrode layer 21 contains Cu or Ni. For example, the electroconductive paste is obtained by taking a powder made of Cu or Ni, a glass component, an organic binder, and an organic solvent. The thickness of the first electrode layer 21 is, for example, 20 µm at a maximum and 5 µm at a minimum.

The second electrode layer 23 is formed by plating on the first electrode layer 21. In the present embodiment, the second electrode layer 23 is an Ni-plated layer formed by Ni plating on the first electrode layer 21. The second electrode layer 23 may be an Sn-plated layer. The second electrode layer 23 contains Ni or Sn. The thickness of the second electrode layer 23 is, for example, from 1 to 5 µm.

The third electrode layer 25 is formed by plating on the second electrode layer 23. In the present embodiment, the third electrode layer 25 is a Cu-plated layer formed by Cu plating on the second electrode layer 23. The third electrode layer 25 may be an Au-plated layer. The third electrode layer 25 contains Cu or Au. The thickness of the third electrode layer 25 is, for example, from 1 to 15 µm.

In the present embodiment as described above, the length in the first direction D1 of the element body 2 is smaller than the length in the third direction D3 of the element body 2 and smaller than the length in the second direction D2 of the element body 2. For this reason, the multilayer capacitor C1 is obtained that has reduced height, and is suitable for built-in mounting in a substrate. The first terminal electrode 5 includes the electrode portions 5a, 5b disposed on the principal surfaces 2a, 2b and the second terminal electrode 7 includes a the electrode portions 7a, 7b disposed on the principal surfaces 2a, 2b. The multilayer capacitor C1 can be electrically connected to wiring formed on the substrate, on the principal surface 2a side of the element body 2, on the principal surface 2b side of the element body 2, or, on both of the principal surface 2a, 2b sides of the element body 2. Therefore, the multilayer capacitor C1 can be readily built into the substrate.

Figure 8:
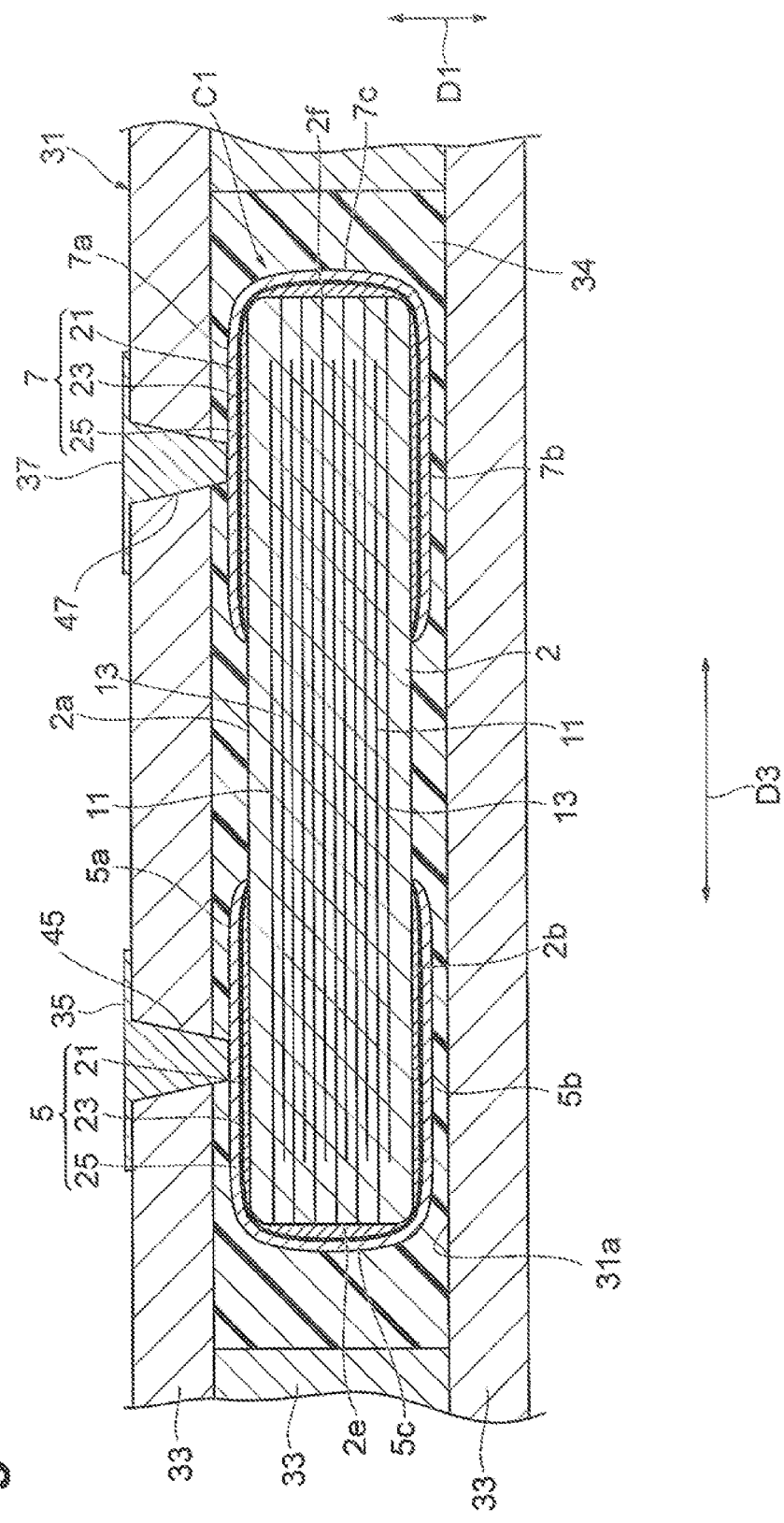
FIG. 8 is a drawing for explaining a mounted structure of the multilayer capacitor according to the embodiment.

The multilayer capacitor C1, as shown in FIG. 8, is mounted as embedded in a substrate 31. The multilayer capacitor C1 is built into the substrate 31. FIG. 8 is a drawing for explaining a mounted structure of the multilayer capacitor according to the present embodiment.

The substrate 31 is constructed by stacking a plurality of insulating layers 33. The insulating layers 33 are made of an insulating material such as ceramic or resin, and are integrated with each other by adhesion or the like.

The multilayer capacitor C1 is disposed in a housing portion 31a formed in the substrate 31. The multilayer capacitor C1 is fixed to the substrate 31 by resin 34 filled in the housing portion 31a. The multilayer capacitor C1 is embedded in the substrate 31. In the mounted structure shown in FIG. 8, the multilayer capacitor C1 is disposed in the housing portion 31a in such a manner that the principal surface 2b of the element body 2 opposes a bottom portion of the housing portion 31a.

The multilayer capacitor C1 is electrically connected through via conductors 45, 47 to electrodes 35, 37 disposed on the surface of the substrate 31. In the mounted structure shown in FIG. 8, the electrode portion 5a of the first terminal electrode 5 is electrically connected through the via conductor 45 to the electrode 35. The electrode portion 7a of the second terminal electrode 7 is electrically connected through the via conductor 47 to the electrode 37.

The via conductors 45, 47 are formed by growing an electoconductive metal (e.g., Cu or Au or the like) in via holes formed in the substrate 31. The growth of the electroconductive metal is realized, for example, by electroless plating. The via holes are formed to reach the electrode portions 5a, 7a of the first and second terminal electrodes 5, 7 of the multilayer capacitor C1 from the surface side of the substrate 31. The visa holes are formed, for example, by laser processing.

In the multilayer capacitor C1, the electrode portions 5a, 7a include the third electrode layers 25 as plated layers. Therefore, the electrode portions 5a, 7a can be securely connected to the via conductors 45, 47 formed in the via holes. When the via conductors 45, 47 are formed by plating, the via conductors 45, 47 are more securely connected to the electrode portions 5a, 7a.

The below will detail surface roughness of the electrode portions 5a, 5b, 7a, 7b and surface roughness of the electrode portions 5c, 5d, 7c, 7d.

The inventors conducted the following tests in order to clarify a range of the surface roughness of the electrode portions 5a, 5b, 7a, 7b and a range of the surface roughness of the electrode portions 5c, 5d, 7c, 7d. Samples 1 to 19 different in surface roughness of the electrode portions 5a, 5b, 5c, 5d, 7a, 7b, 7c, 7d are prepared, and the number of void occurrences and the number of peeling occurrences in each of Samples 1 to 19 are checked. The results are shown in FIG. 9. FIG. 9 is a table showing the number of void occurrences and the number of peeling occurrences in each of the Samples.

The surface roughness of the electrode portions 5a, 5b, 5c, 5d, 7a, 7b, 7c, 7d can be varied, for example, by using different electroconductive pastes to be used in forming the first electrode layers 21. The surface roughness varies depending on particle sizes of metal powder (e.g., Ni powder or Cu powder or the like) contained in the electroconductive pastes. As the particle size of the metal powder increases, the surface roughness becomes larger. Therefore, the surface roughness can be differentiated, for example, by making a difference in particle size of the metal powder between the electroconductive paste used in forming the electrode portions 5a, 5b, 7a, 7b and the electroconductive paste used in forming the electrode portions 5c, 5d, 7c, 7d. Besides the method of making the difference of the electroconductive pastes used in forming the first electrode layers 21, the surface roughness can also be differentiated by a method of, after the first electrode layers 21 are formed, carrying out a roughening process or a polishing process for the surfaces of the first electrode layers 21.

The arithmetic mean deviation (Ra) was employed to represent the surface roughness of the electrode portions 5a, 5b, 5c, 5d, 7a, 7b, 7c, 7d. The arithmetic mean deviation (Ra) is defined in JIS B 0601: 2013 (ISO 4287: 1997).

Each of Samples 1 to 19 is a lot including a plurality of specimens. The specimens in each Sample 1-19 have the same configuration except for the aforementioned difference in surface roughness. The specimens in each Sample 1-19 have the length of 0.17 mm in the first direction D1 of the element body 2, the length of 0.49 mm in the second direction D2 of the element body 2, and the length of 0.98 mm in the third direction D3 of the element body 2.

In each specimen of Sample 1, the arithmetic mean deviation of the surfaces of the electrode portions 5a, 5b, 7a, 7b is 0.15 µm and the arithmetic mean deviation of the surfaces of the electrode portions 5c, 5d, 7c, 7d is 0.19 µm. In each specimen of Sample 2, the arithmetic mean deviation of the surfaces of the electrode portions 5a, 5b, 7a, 7b is 0.15 µm and the arithmetic mean deviation of the surfaces of the electrode portions 5c, 5d, 7c, 7d is 0.25 µm. In each specimen of Sample 3, the arithmetic mean deviation of the surfaces of the electrode portions 5a, 5b, 7a, 7b is 0.15 µm and the arithmetic mean deviation of the surfaces of the electrode portions 5c, 5d, 7c, 7d is 0.38 µm.

In each specimen of Sample 4, the arithmetic mean deviation of the surfaces of the electrode portions 5a, 5b, 7a, 7b is 0.20 µm and the arithmetic mean deviation of the surfaces of the electrode portions 5c, 5d, 7c, 7d is 0.18 µm. In each specimen of Sample 5, the arithmetic mean deviation of the surfaces of the electrode portions 5a, 5b, 7a, 7b is 0.20 µm and the arithmetic mean deviation of the surfaces of the electrode portions 5c, 5d, 7c, 7d is 0.27 µm. In each specimen of Sample 6, the arithmetic mean deviation of the surfaces of the electrode portions 5a, 5b, 7a, 7b is 0.20 µm and the arithmetic mean deviation of the surfaces of the electrode portions 5c, 5d, 7c, 7d is 0.34 µm.

In each specimen of Sample 7, the arithmetic mean deviation of the surfaces of the electrode portions 5a, 5b, 7a, 7b is 0.20 µm and the arithmetic mean deviation of the surfaces of the electrode portions 5c, 5d, 7c, 7d is 0.38 µm. In each specimen of Sample 8, the arithmetic mean deviation of the surfaces of the electrode portions 5a, 5b, 7a, 7b is 0.20 µm and the arithmetic mean deviation of the surfaces of the electrode portions 5c, 5d, 7c, 7d is 0.40 µm. In each specimen of Sample 9, the arithmetic mean deviation of the surfaces of the electrode portions 5a, 5b, 7a, 7b is 0.23 µm and the arithmetic mean deviation of the surfaces of the electrode portions 5c, 5d, 7c, 7d is 0.25 µm.

In each specimen of Sample 10, the arithmetic mean deviation of the surfaces of the electrode portions 5a, 5b, 7a, 7b is 0.23 µm and the arithmetic mean deviation of the surfaces of the electrode portions 5c, 5d, 7c, 7d is 0.28 µm. In each specimen of Sample 11, the arithmetic mean deviation of the surfaces of the electrode portions 5a, 5b, 7a, 7b is 0.23 µm and the arithmetic mean deviation of the surfaces of the electrode portions 5c, 5d, 7c, 7d is 0.32 µm. In each specimen of Sample 12, the arithmetic mean deviation of the surfaces of the electrode portions 5a, 5b, 7a, 7b is 0.23 µm and the arithmetic mean deviation of the surfaces of the electrode portions 5c, 5d, 7c, 7d is 0.37 µm.

In each, specimen of Sample 13, the arithmetic mean deviation of the surfaces of the electrode portions 5a, 5b, 7a, 7b is 0.23 µm and the arithmetic mean deviation of the surfaces of the electrode portions 5c, 5d, 7c, 7d is 0.40 µm. In each specimen of Sample 14, the arithmetic mean deviation of the surfaces of the electrode portions 5a, 5b, 7a, 7b is 0.26 µm and the arithmetic mean deviation of the surfaces of the electrode portions 5c, 5d, 7c, 7d is 0.25 µm. In each specimen of Sample 15, the arithmetic mean deviation of the surfaces of the electrode portions 5a, 5b, 7a, 7b is 0.26 µm and the arithmetic mean deviation of the surfaces of the electrode portions 5c, 5d, 7c, 7d is 0.27 µm.

In each specimen of Sample 16, the arithmetic mean deviation of the surfaces of the electrode portions 5a, 5b, 7a, 7b is 0.26 µm and the arithmetic mean deviation of the surfaces of the electrode portions 5c, 7d, 7c, 7d is 0.32 µm. In each specimen of Sample 17, the arithmetic mean deviation of the surfaces of the electrode portions 5a, 5b, 7a, 7b is 0.26 µm and the arithmetic mean deviation of the surfaces of the electrode portions 5c, 5d, 7c, 7d is 0.38 µm. In each specimen of Sample 18, the arithmetic mean deviation of the surfaces of the electrode portions 5a, 5b, 7a, 7b is 0.26 µm and the arithmetic mean deviation of the surfaces of the electrode portions 5c, 5d, 7c, 7d is 0.40 µm. In each specimen of Sample 19, the arithmetic mean deviation of the surfaces of the electrode portions 5a, 5b, 7a, 7b is 0.30 µm and the arithmetic mean deviation of the surfaces of the electrode portions 5c, 5d, 7c, 7d is 0.27 µm.

The number of void occurrences was determined as follows. First, ten specimens were chosen from each of Samples 1 to 19. Each chosen specimen was disposed in the housing portion 31a of the substrate 31 and then the housing portion 31a was filled with the resin 34, thereby embedding the specimen in the substrate 31. Thereafter, the via holes were formed in the substrate 31 (resin 34) by laser processing to reach the first and second terminal electrodes 5, 7. The via conductors 45, 47 were formed in the via holes by electroless plating, thereby connecting the first and second terminal electrodes 5, 7 to the via conductors 45, 47. Through these processes, the substrates 31 with the respective specimens mounted thereon are prepared. The resin 34 used was an epoxy resin.

Each substrate 31 with the specimen thereon was cut at the position including the specimen (first and second terminal electrodes 5, 7) and the via conductors 45, 47. The presence or absence of a void in the cut plane was checked by visual inspection. The number of specimens with which occurrence of a void was confirmed was counted. In this case, it was determined whether a void occurred between the first and second terminal electrodes 5, 7 (electrode portions 5a, 5b, 7a, 7b) and the via conductors 45, 47 and whether a void occurred between the first and second terminal electrodes 5, 7 (electrode portions 5c, 5d, 7c, 7d) and the resin 34.

It was found that when the arithmetic mean deviation of the surfaces of the electrode portions 5a, 5b, 7a, 7b was not less than 0.30 µm, there were specimens with the void occurring between the electrode portions 5a, 5b, 7a, 7b and the via conductors 45, 47. It is presumed that when the arithmetic mean deviation of the surfaces of the electrode portions 5a, 5b, 7a, 7b is not less than 0.30 µm, the metal is less likely to become suitably precipitated on the electrode portions 5a, 5b, 7a, 7b in a process of forming the via conductors 45, 47, because of unevenness of the surfaces of the electrode portions 5a, 5b, 7a, 7b, so as to result in occurrence of the void. It was confirmed that none of Samples 1 to 18 included any specimen with the void occurring between the electrode portions 5a, 5b, 7a, 7b and the via conductors 45, 47.

It was found that when the arithmetic mean deviation of the surfaces of the electrode portions 5c, 5d, 7c, 7d was not less than 0.4 µm, there were specimens with the void occurring between the electrode portions 5c, 5d, 7c, 7d and the resin 34. It is presumed that when the arithmetic mean deviation of the surfaces of the electrode portions 5c, 5d, 7c, 7d is not less than 0.40 µm, the void occurs because the resin 34 fails to fully intrude into depressions of the unevenness of the surfaces of the electrode portions 5c, 5d, 7c, 7d. It was confirmed that none of Samples 1 to 7, 9 to 12, 14 to 17, and 19 included any specimen with the void occurring between the electrode portions 5c, 5d, 7c, 7d and the resin 34.

The number of peeling occurrences was determined as follows. First, ten specimens were chosen from each of Samples 1-7, 9-12, and 14-17 with which no void occurrence was confirmed, and the substrates 31 with the respective specimens mounted thereon were prepared by the same procedure as the above-described procedure. Each substrate 31 with the specimen thereon was subjected to five reflow tests under a nitrogen atmosphere. The conditions for the reflow tests were as follows. As a pretreatment, preheating was first conducted at 125° C. for twenty four hours and, thereafter, reflow at a peak temperature of 260° C. was carried out.

After the reflow tests, each substrate 31 with the specimen thereon was cut at the position including the specimen (first and second terminal electrodes 5, 7) and the via conductors 45, 47. The presence or absence of peeling is the cut plane was checked by visual inspection. The number of specimens with which occurrence of peeling was confirmed was counted. In this case, it was determined whether peeling occurred between the first and second terminal electrodes 5, 7 (electrode portions 5a, 5b, 7a, 7b) and the via conductors 45, 47 and whether peeling occurred between the first and second terminal electrodes 5, 7 (electrode portions 5c, 5d, 7c, 7d) and the resin 34.

It was found that when the arithmetic mean deviation of the surfaces of the electrode portions 5a, 5b, 7a, 7b was not more than 0.15 μm, there were specimens with peeling occurring between the electrode portions 5a, 5b, 7a, 7b and the via conductors 45, 47. It is presumed that when the arithmetic mean deviation of the surfaces of the electrode portions 5a, 5b, 7a, 7b is not more than 0.15 μm sufficient adhesion is not achieved between the electrode portions 5a, 5b, 7a, 7b and the via conductors 45, 47, so as to result in occurrence of peeling between the electrode portions 5a, 5b, 7a, 7b and the via conductors 45, 47. It was confirmed that none of Samples 4-7, 9-12, and 14-17 included any specimen with peeling occurring between the electrode portions 5a, 5b, 7a, 7b and the via conductors 45, 47.

It was found that when the arithmetic mean deviation of the surfaces of the electrode portions 5c, 5d, 7c, 7d was not more than 0.25 μm, there were specimens with peeling occurring between the electrode portions 5c, 5d, 7c, 7d and the resin 34. It is presumed that when the arithmetic mean deviation of the surfaces of the electrode portions 5c, 5d, 7c, 7d is not more than 0.25 μm, peeling occurs between the electrode portions 5c, 5d, 7c, 7d and the resin 34 because, although the resin 34 can intrude into the depressions of the unevenness of the surfaces of the electrode portions 5c, 5d, 7c, 7d, the amount of intruding resin 34 is too small to achieve sufficient adhesion between the electrode portions 5c, 5d, 7c, 7d and the resin 34. It was confirmed that none of Samples 3, 5-7, 10-12, and 15-17 included any specimen with peeling occurring between the electrode portions 5c, 5d, 7c, 7d and the resin 34.

It was confirmed that none of Samples 5-7, 10-12, and 15-17 included any specimen with occurrence of the void and peeling.

It is seen from the above that when the arithmetic mean deviation of the surfaces of the electrode portions 5a, 5b, 7a, 7b is from 0.20 to 0.26 μm and when the arithmetic mean deviation of the surfaces of the electrode portions 5c, 5d, 7c, 7d is from 0.27 to 0.38 μm, the void is prevented from occurring between the electrode portions 5a, 5b, 7a, 7b and the via conductors 45, 47. The void is also prevented from occurring between the electrode portions 5c, 5d, 7c, 7d and the resin 34. Peeling is also prevented from occurring between the electrode portions 5a, 5b, 7a, 7b and the via conductors 45, 47. Peeling is also prevented from occurring between the electrode portions 5c, 5d, 7c, 7d and the resin 34. As a result of these, the multilayer capacitor C1 is suitably built into the substrate 31, and ensures the connectivity to the via conductors 45, 47 formed in the substrate 31.

The following will detail surface roughness of the element body 2 and, particularly, surface roughness of the portion of the element body 2 exposed from the first and second terminal electrodes 5, 7.

The inventors conducted the following tests to clarify a range of the surface roughness of the portion of the element body 2 exposed from the first and second terminal electrodes 5, 7. Samples 20 to 37 different in surface roughness of the element body 2 are prepared, and the number of void occurrences and the number of peeling occurrences in each of Samples 20 to 37 are checked. The results are shown in FIG. 10. FIG. 10 is a table showing the number of void occurrences and the number of peeling occurrences in each of the Samples. The surface roughness employed herein was also the arithmetic mean deviation (Ra). The surface roughness of the element body 2 can be varied, for example, by using different dielectric materials for ceramic green sheets or by polishing a laminate body including a lamination of ceramic green sheets, in forming the element body.

Each of Samples 20 to 37 is a lot including a plurality of specimens. The specimens in each of Samples 20-24 have the same configuration except for the difference in surface roughness of the element body 2. The specimens in respective Samples 25-28 have the same configuration except for the difference in surface roughness of the element body 2. The specimens in respective Samples 29-33 have the same configuration except for the difference in surface roughness of the element body 2. The specimens in respective Samples 34-37 have the same configuration except for the difference in surface roughness of the element body 2. The specimens in respective Samples 20-37 have the length of 0.17 mm in the first direction D1 of the element body 2, the length of 0.49 mm in the second direction D2 of the element body 2, and the length of 0.98 mm in the third direction D3 of the element body 2.

In each specimen of Samples 20-24, the arithmetic mean deviation of the surfaces of the electrode portions 5a, 5b, 7a, 7b is 0.20 μm and the arithmetic mean deviation, of the surfaces of the electrode portions 5c, 5d, 7c, 7d is 0.27 μm. In each specimen of Samples 25-28, the arithmetic mean deviation of the surfaces of the electrode portions 5a, 5b, 7a, 7b is 0.26 μm and the arithmetic mean deviation of the surfaces of the electrode portions 5c, 5d, 7c, 7d is 0.27 μm. In each specimen of Samples 29-33, the arithmetic mean deviation of the surfaces of the electrode portions 5a, 5b, 7a, 7b is 0.20 μm and the arithmetic mean deviation of the surfaces of the electrode portions 5c, 5d, 7c, 7d is 0.38 μm. In each specimen of Samples 34-37, the arithmetic mean deviation of the surfaces of the electrode portions 5a, 5b, 7a, 7b is 0.26 μm and the arithmetic mean deviation of the surfaces of the electrode portions 5c, 5d, 7c, 7d is 0.38 μm.

In each specimen of Sample 20, the arithmetic mean deviation of the surface of the element body 2 is 0.12 μm. In each specimen of Sample 21, the arithmetic mean deviation of the surface of the element body 2 is 0.14 μm. In each specimen of Sample 22, the arithmetic mean deviation of the surface of the element body 2 is 0.16 μm. In each specimen of Sample 23, the arithmetic mean deviation of the surface of the element body 2 is 0.19 μm. In each specimen of Sample 24, the arithmetic mean deviation of the surface of the element body 2 is 0.27 μm. In each specimen of Sample 25, the arithmetic mean deviation of the surface of the element body 2 is 0.14 μm. In each specimen of Sample 26, the arithmetic mean deviation of the surface of the element body 2 is 0.17 μm, in each specimen of Sample 27, the arithmetic mean deviation of the surface of the element body 2 is 0.19 μm. In each specimen of Sample 28, the arithmetic mean deviation of the surface of the element body 2 is 0.21 μm.

In each specimen of Sample 29, the arithmetic mean, deviation of the surface of the element body 2 is 0.11 μm. In each specimen of Sample 30, the arithmetic mean deviation of the surface of the element body 2 is 0.14 μm, in each specimen of Sample 31, the arithmetic mean deviation of the surface of the element body 2 is 0.15 μm. In each specimen of Sample 32, the arithmetic mean deviation of the surface of the element body 2 is 0.18 μm. In each specimen of Sample 33, the arithmetic mean deviation of the surface of the element body 2 is 0.25 μm. In each specimen of Sample 34, the arithmetic mean deviation of the surface of the element body 2 is 0.14 μm. In each specimen of Sample 35, the arithmetic mean deviation of the surface of the element body 2 is 0.17 μm. In each specimen of Sample 36, the arithmetic mean deviation of the surface of the element body 2 is 0.19 μm. In each specimen of Sample 37, the arithmetic mean deviation of the surface of the element body 2 is 0.22 μm.

The number of void occurrences was determined as follows. First ten specimens were chosen from each of Samples 20 to 37 and the substrates 31 with the respective specimens mounted thereon were prepared by the same procedure as the aforementioned procedure. Each substrate 31 with the specimen thereon was cut at the position including the portion of the element body 2 exposed from the first and second terminal electrodes 5, 7. The presence or absence of a void in the cut plane was checked by visual inspection. The number of specimens wife which occurrence of a void was confirmed was counted. In this case, it was determined whether a void occurred between the element body 2 (the portion exposed from the first and second terminal electrodes 5, 7) and the resin 34.

It was found that when the arithmetic mean deviation of the surface of the element body 2 (the portion exposed from the first and second terminal electrodes 5, 7) was not less than 0.21 μm, there were specimens with the void occurring between the element body 2 and the resin 34. It is presumed that when the arithmetic mean deviation of the surface of the element body 2 is not less than 0.21 μm, the void occurs because the resin 34 fails to fully intrude into depressions of the unevenness of the surface of the element body 2. It was confirmed that none of Samples 20-23, 25-27, 29-32, and 34-36 included any specimen with the void occurring between the element body 2 and the resin 34.

The number of peeling occurrences was determined as follows. First, ten specimens were chosen from each of Samples 20-23, 25-27, 29-32, and 34-36 with which no void occurrence was confirmed, and the substrates 31 with the respective specimens mounted thereon were prepared by the same procedure as the above-described procedure. Each substrate 31 with the specimen thereon was subjected to five reflow tests under a nitrogen atmosphere. The conditions for the reflow tests were as follows. As a pretreatment, preheating was first conducted at 125° C. for twenty four hours and, thereafter, reflow at a peak temperature of 260° C. was carried out.

After the reflow tests, each substrate 31 with the specimen thereon was cut at the position including the portion of the element body 2 exposed from the first and second terminal electrodes 5, 7. The presence or absence of peeling in the cut plane was checked by visual inspection. The number of specimens with which occurrence of peeling was confirmed was counted. In this case, it was determined whether peeling occurred between the element body 2 (the portion exposed from the first and second terminal electrodes 5, 7) and the resin 34.

It was found that when the arithmetic mean deviation of the surface of the element body 2 was not more than 0.12 μm, there were specimens with peeling occurring between the element body 2 and the resin 34. It is presumed that when the arithmetic mean deviation of the surface of the element body 2 is not more than 0.12 μm, the peeling occurs between the element body 2 and the resin 34 because, although the resin 34 can intrude into the depressions of the unevenness of the surface of the element body 2, the amount of intruding resin 34 is too small to achieve sufficient adhesion between the element body 2 and the resin 34. It was confirmed that none of Samples 21-23, 25-27, 30-32, and 34-36 included any specimen with peeling occurring between the element body 2 and the resin 34.

It was confirmed that none of Samples 21-23, 25-27, 30-32, and 34-36 included any specimen with occurrence of the void and peeling.

It is seen from the above that when the arithmetic mean deviation of the surface of the element body 2 is from 0.14 to 0.19 μm, the void is prevented from occurring between the element body 2 and the resin 34. Peeling is also prevented from occurring between the element body 2 and the resin 34. As a result of these, the multilayer capacitor C1 is more suitably built into the substrate.

The embodiment of the present invention has been described above, but it should be noted that the present invention is not always limited only to the above-described embodiment but can be modified in many ways without departing from the spirit and scope of the invention.

The first terminal electrode 5 does not have to include the electrode portions 5d. The first terminal electrode 5 may be formed on the three surfaces 2a, 2b, and 2c. The second terminal electrode 7 does not have to include the electrode portions 7d. The first terminal electrode 7 may be formed on the three surfaces 2a, 2b, and 2d.

What is claimed is:

1. A multilayer capacitor comprising:
    an element body of a rectangular parallelepiped shape, the element body including a pair of principal surfaces opposing each other, a pair of side surfaces opposing each other, and another pair of side surfaces opposing each other;
    a plurality of internal electrodes disposed in the element body to oppose each other in a direction in which the pair of principal surfaces oppose each other; and
    a pair of terminal electrodes connected each to corresponding internal electrodes out of the plurality of internal electrodes, each of the terminal electrodes including a first electrode portion disposed on the principal surface and a second electrode portion disposed on the side surface,
    wherein a length of the element body in the direction in which the pair of principal surfaces oppose each other is smaller than a length of the element body in a direction in which the pair of side surfaces oppose each other and smaller than a length of the element body in a direction in which the other pair of side surfaces oppose each other, wherein an arithmetic mean deviation of the surface of the first electrode portion is from 0.20 to 0.26 µm, and wherein an arithmetic mean deviation of the surface of the second electrode portion is from 0.27 to 0.38 µm.

2. The multilayer capacitor according to claim 1, wherein an arithmetic mean deviation of the surface of the element body exposed from the pair of terminal electrodes is from 0.14 to 0.19 µm.

* * * * *